United States Patent
Liu et al.

(10) Patent No.: US 7,933,283 B1
(45) Date of Patent: Apr. 26, 2011

(54) SHARED MEMORY MANAGEMENT

(75) Inventors: Hao Howard Liu, Milpitas, CA (US);
Eugene W. Lee, San Jose, CA (US)

(73) Assignee: Cortina Systems, Inc., Sunnyvale, CA (US)

( * ) Notice: Subject to any disclaimer, the term of this patent is extended or adjusted under 35 U.S.C. 154(b) by 87 days.

(21) Appl. No.: 12/073,317

(22) Filed: Mar. 4, 2008

(51) Int. Cl.
*H04L 12/54* (2006.01)
*G06F 15/167* (2006.01)

(52) U.S. Cl. .................... 370/412; 370/428; 709/213

(58) Field of Classification Search .................. None
See application file for complete search history.

(56) References Cited

U.S. PATENT DOCUMENTS

| | | | |
|---|---|---|---|
| 7,092,396 B2 * | 8/2006 | Lee et al. | 370/395.4 |
| 7,369,500 B1 * | 5/2008 | Gallagher et al. | 370/235 |
| 7,496,034 B2 * | 2/2009 | Fukunaga et al. | 370/230 |
| 7,525,917 B2 * | 4/2009 | Ferolito et al. | 370/236.1 |
| 2005/0055406 A1 * | 3/2005 | Singhai et al. | 709/206 |
| 2008/0304503 A1 * | 12/2008 | Blake | 370/412 |
| 2009/0228568 A1 * | 9/2009 | Stewart et al. | 709/214 |

* cited by examiner

*Primary Examiner* — Chi H Pham
*Assistant Examiner* — Soon-Dong D Hyun

(57) ABSTRACT

Shared memory management apparatus and techniques are disclosed. A shared memory provides queues for storing communication traffic that is to be scheduled for transmission. Based on amounts of communication traffic stored in the queues, a determination is made as to whether or not communication traffic is to be removed from the shared memory, and if so, communication traffic is removed. Traffic may be selected for removal based on one or more of: a scheduling algorithm for scheduling communication traffic out of the queues for transmission, thresholds associated with the queues, and latency of the communication traffic stored in the queues. Removal of communication traffic from the shared memory is coordinated with scheduling of communication traffic in some embodiments.

22 Claims, 2 Drawing Sheets

SHARED MEMORY MANAGEMENT

FIELD OF THE INVENTION

This invention relates generally to communications and, in particular, to management of shared memory in which communication traffic is stored for scheduling.

BACKGROUND

In shared memory scheduling architectures, data received from ingress sources are temporarily stored in a commonly shared memory space. The stored data are then sent to egress destinations based on an egress scheduling algorithm. The amount of storage space determines system latency, the ability to handle egress congestion, and system cost. When egress traffic is congested, the shared memory will eventually become fully occupied. At that point, all ingress data will be dropped due to lack of memory space. This is known as tail drop, and distributes memory space unfairly among ingress sources.

In a system with multiple egress queues, WRED (Weighted Random Early Detection, also known as Weighted Random Early Discard) is a common way to address the above issue by monitoring the average queue size and dropping data based on statistical probabilities. If the shared memory is almost empty, all incoming data are accepted. As the amount of stored egress queue data grows and the shared memory occupancy increases, the probability for dropping incoming data also increases. When the shared storage space is full, the probability has reached 1 and all incoming data are dropped. WRED is considered fairer than tail drop in managing shared memory in that the more data an ingress source outputs to egress queues, the more likely it is that data from that source will be dropped.

However, WRED cannot take into account the storage capacity needs of an egress scheduler. WRED operates at the input of the egress queues in a shared memory scheduling architecture and would not be aware of scheduling parameters applied in scheduling data out of those queues. In addition, WRED cannot manage shared memory efficiency while maintaining an average queue size for all of the egress queues. For example, if egress transmission is so congested that the egress scheduler can only transmit data from a high precedence queue, the data in other egress queues can only be stored and will have little chance to be transmitted. The shared memory space occupied by lower precedence data, however, can never be released by WRED and other queue input data dropping mechanisms. The resulting storage space shortage can eventually cause problems such as:
1. very long latency for data from low precedence queues;
2. ingress drop of all high precedence data as well as low precedence data;
3. egress scheduling errors since not enough high precedence data are stored in the shared memory to fulfill egress bandwidth;
4. when congestion is relieved, old data could flood a destination, which would be undesirable.

SUMMARY OF THE INVENTION

Thus, there remains a need for improved shared memory management schemes.

According to one aspect of the invention, there is provided an apparatus that includes an interface and a memory manager. The interface provides access to a shared memory, the shared memory providing a plurality of queues for storing communication traffic to be scheduled for transmission. The memory manager is operatively coupled to the interface, determines, based on amounts of communication traffic stored in the queues, whether communication traffic is to be removed from the shared memory, and removes communication traffic from the shared memory where it is determined that communication traffic is to be removed.

The memory manager might remove communication traffic from the shared memory in accordance with a removal rule. The removal rule could be based on a scheduling algorithm for scheduling communication traffic out of the queues for transmission, respective possibly programmable thresholds associated with the queues, and/or latency of the communication traffic stored in the queues.

In some embodiments, the plurality of queues comprises at least one of: respective queues for storing communication traffic having different scheduling priorities, and respective queues for storing communication traffic to be transmitted to different destinations.

The memory manager may re-allocate memory space, which is freed in the shared memory by removing communication traffic from one of the queues, from the one of the queues to a different one of the queues.

The apparatus may also include a scheduler that schedules communication traffic stored in the queues for transmission. The memory manager may be operatively coupled to the scheduler, and coordinate removal of communication traffic from the shared memory with scheduling of communication traffic by the scheduler.

In some embodiments, the shared memory is operatively coupled to the memory manager through the interface and to the scheduler.

The memory manager schedules communication traffic stored in the queues for transmission in some embodiments.

A method is also provided, and includes storing, in a shared memory that provides a plurality of queues, communication traffic to be scheduled for transmission; determining, based on amounts of communication traffic stored in the queues, whether communication traffic is to be removed from the shared memory; and removing communication traffic from the shared memory where it is determined that communication traffic is to be removed.

The operation of removing might involve removing communication traffic from the shared memory in accordance with a removal rule. As noted above, the removal rule could be based on a scheduling algorithm for scheduling communication traffic out of the queues for transmission, respective possibly programmable thresholds associated with the queues, and/or latency of the communication traffic stored in the queues.

The method may also include scheduling communication traffic stored in the queues for transmission, in which case the removing can be coordinated with the scheduling.

In some embodiments, the method includes re-allocating memory space, which is freed in the shared memory by removing communication traffic from one of the queues, from the one of the queues to a different one of the queues.

Such a method may be embodied, for example, in instructions stored on a non-transitory computer-readable medium.

Another aspect of the invention provides an apparatus that includes a shared memory providing a plurality of queues for storing communication traffic; a scheduler, operatively coupled to the shared memory, that schedules communication traffic stored in the queues for transmission; and a memory manager, operatively coupled to the memory interface, that determines whether communication traffic is to be removed from the shared memory, and removes communication traffic from the shared memory where it is determined that communication traffic is to be removed, the memory manager coordinating removal of communication traffic from the shared memory with scheduling of communication traffic by the scheduler.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

As noted above, some conventional memory management techniques control storage of data to queues in a shared memory. Embodiments of the invention improve storage efficiency and preserve the storage capacity of a shared memory to satisfy scheduling needs for multiple traffic queues, which may have different scheduling precedence. Differentiated storage capacity can be provided to multiple egress queues sharing the same memory space. Shared memory space is monitored and managed actively and dynamically. In a situation of egress transmission congestion and shortage of memory space in a shared memory, a memory manager is activated and stored data can be selectively removed from queues to release memory space for new data. The storage space can thus be re-allocated from some of the queues to others, thereby improving storage efficiency and allowing a smaller amount of memory to be used.

These and other features and advantages will become apparent from the following description of conventional mechanisms and embodiments of the invention, in the context of an example ingress and egress scheduling scenario.

Figure 1:
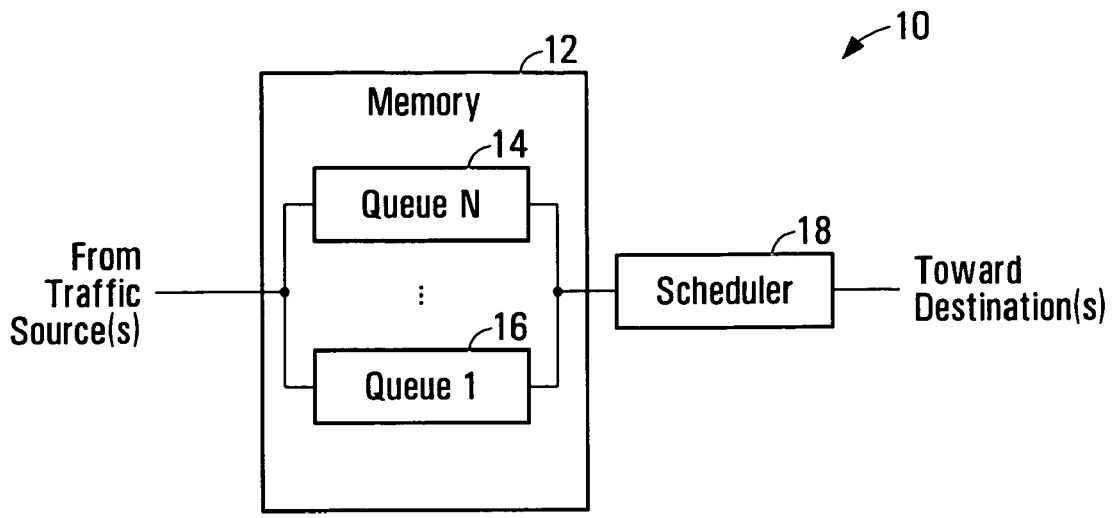
FIG. 1 is a block diagram of a conventional scheduling architecture.

FIG. 1 is a block diagram of a conventional scheduling architecture 10, which includes N queues 14, 16, provided by a shared memory 12, and a scheduler 18. Traffic received from ingress sources is stored in the queues 14, 16 and scheduled toward one or more destinations by the scheduler 18.

Consider an example in which the shared memory 12 has a capacity of 200 Mb, N=2, Queue N (14) is set for higher precedence than Queue 1 (16), and the egress scheduling by the scheduler 18 is SP (Strict Priority), such that the traffic in Queue N is always transmitted before the traffic in Queue 1. Suppose also that the ingress data rate from the traffic source(s) is 200 Mbps, out of which 50% goes to Queue N (14) and 50% goes to Queue 1 (16). Finally, for the purposes of this example, assume that the average egress bandwidth is 100 Mbps but the actual bandwidth varies in accordance with the timing diagram 20 shown in FIG. 2.

At the end of the first one-second period, a total of 200 Mb of traffic is received from the ingress source(s), 100 Mb of the received traffic is stored in each of the queues 14, 16, and a total of 50 Mb of traffic is transmitted from Queue N (14) to the egress destination(s) by the scheduler 18. The traffic remaining in the shared memory 12 includes 100 Mb in Queue 1 (16) and 50 Mb in Queue N (14).

Figure 2:
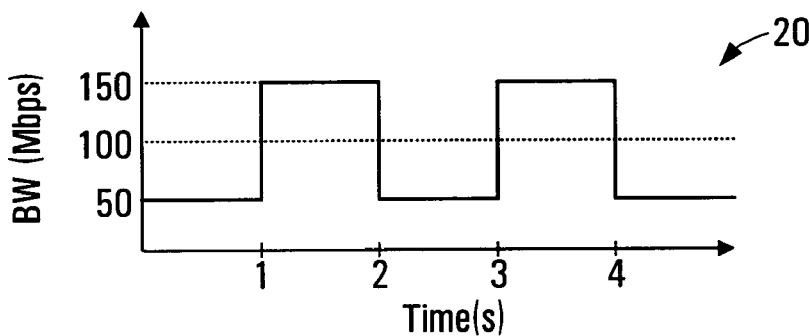
FIG. 2 is a timing diagram showing an example of scheduling bandwidth variation.

During the next second, egress congestion is temporarily eased and the egress bandwidth is increased to 150 Mbps, as shown in FIG. 2. However, the total new traffic received from the ingress side is only about 50 Mbps due to the shared memory limitation, since the 200 Mb shared memory 12 already stores 150 Mb of traffic. Of the received 50 Mb of traffic that is not dropped due to the memory limitation, 25 Mb goes to Queue N (14) and 25 Mb goes to Queue 1 (16). The remainder of the ingress traffic, including traffic to be stored in both of the queues 14, 16, is dropped before entering the shared memory 12.

The total traffic available for the egress scheduler 18 is thus 75 Mb from Queue N (14) and 125 Mb from Queue 1 (16). The egress scheduler 18 transmits the 75 Mb of traffic from Queue N (14) first, and then sends out 75 Mb of traffic from Queue 1 (16), based on its SP scheduling algorithm, to fulfill the total egress bandwidth of 150 Mbps. This may be treated as a scheduling error from an egress destination point of view, in that the destination would expect to receive only high precedence traffic in the above example scenario of an ingress data rate of 100 Mbps for high precedence traffic (i.e., 50% of 200 Mbps) and an average egress data rate of 100 Mbps. Also, 75 Mb of stored traffic from Queue 1 (16) is sent to the destination, which might not be desirable since most of that stored traffic would be old.

At the end of the second one-second period shown in FIG. 2, there is no traffic left in Queue N (14), but 50 Mb of traffic remains in Queue 1 (16).

When egress transmission is congested again during the third one-second period, the egress scheduler 18 can only send out 50 Mb of traffic. From the ingress side, there is another 150 Mb of traffic received and not dropped due to the memory limitation during this time period, including 75 Mb received in Queue N (14) and 75 Mb received in Queue 1 (16). In the end, after transmission of 50 Mb of traffic from the higher precedence Queue N (14) there is 25 Mb of traffic remaining in Queue N and 125 Mb of traffic remaining in Queue 1 (16), for a total of 150 Mb.

During the fourth one-second period, another 50 Mb of traffic is stored in the shared memory 12, including 25 Mb in Queue N (14) and 25 Mb in Queue 1 (16). The rest of the ingress traffic is discarded due to the storage limitation. Egress congestion is temporarily eased again in this time period, as shown in FIG. 2. The egress scheduler 18 needs 150 Mb of traffic to satisfy the egress bandwidth. However, the total traffic available is 50 Mb from Queue N (14) and 150 Mb from Queue 1 (16). Again, this may be deemed a scheduling error at the destination end, due to lack of stored traffic in Queue N (14). The destination is also flooded with 100 Mb of lower precedence traffic from Queue 1 (16).

As can be seen from the example above, the ingress traffic to Queue 1 (16) eventually occupies majority of space in the shared memory 12. The resulting memory shortage prevents new high precedence ingress traffic from entering Queue N (14), causing egress scheduling errors and other undesired effects such a flooding of destination(s) with low precedence traffic, which in some cases would also be older traffic. With the help of WRED to monitor the queues 14, 16 and drop data based on statistical probabilities, the situation could be improved but the problem cannot be solved completely, unless a larger memory 12 is used.

Figure 3:
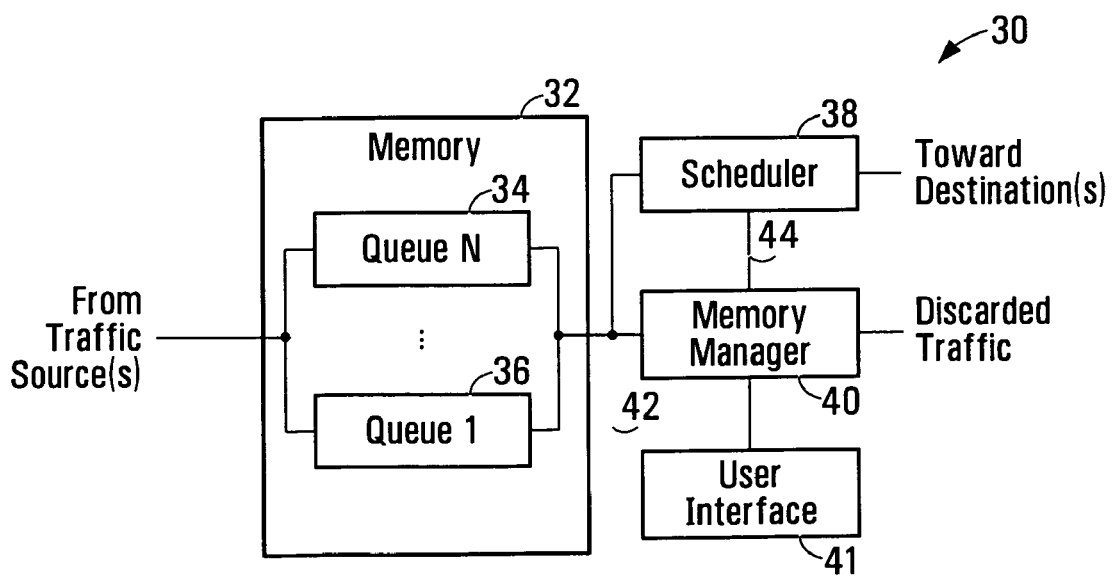
FIG. 3 is a block diagram of a shared memory scheduling architecture according to an embodiment of the invention.

FIG. 3 is a block diagram of a shared memory scheduling architecture 30 according to an embodiment of the invention. The architecture 30 includes a memory 32 which provides N traffic queues 34, 36, a scheduler 38, a memory manager 40, and a user interface 41 operatively coupled to the memory manager. The scheduler 38 and the memory manager 40 are operatively coupled to the queues 34, 36 in the shared memory 32, and also to each other in the example shown.

Figure 4:
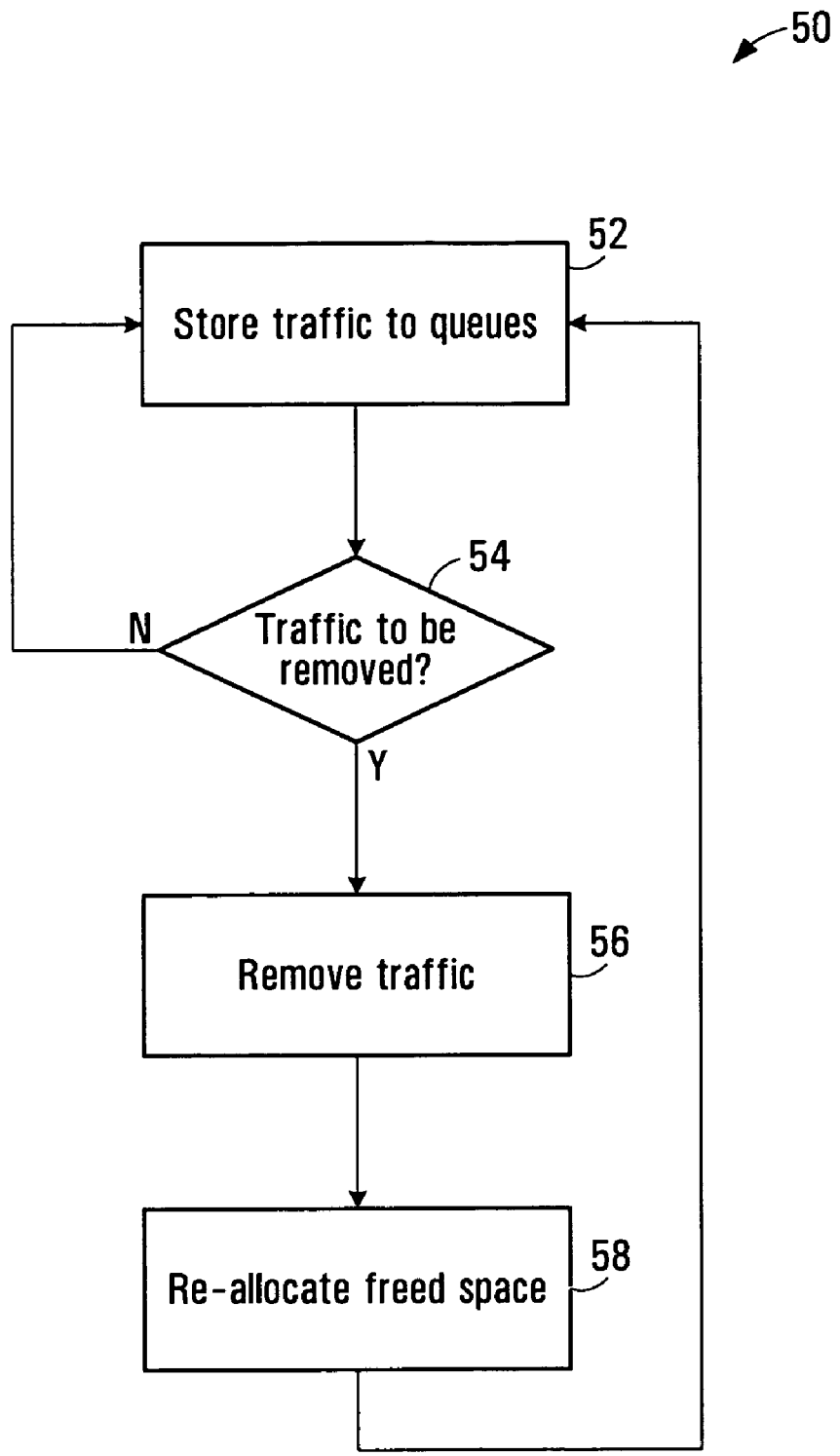
FIG. 4 is a flow diagram illustrating a method according to another embodiment of the invention.

It should be appreciated that the architecture 30 shown in FIG. 3, as well as the flow diagram shown in FIG. 4 and described below, are intended solely for illustrative purposes. For example, a communication device or communication equipment in which or in conjunction with which the architecture 30 is implemented may include additional components that have not been shown in FIG. 3. Thus, embodiments of the present invention are in no way limited to the particular example embodiments explicitly shown in the drawings and described herein. More generally, other embodiments may include further, fewer, and/or different components interconnected in a similar or different manner than shown.

Those skilled in the art will appreciate that the queues 34, 36 may be implemented in any of various forms, using a variety of memory devices. Solid state memory devices are commonly used for this purpose, although other types of memory devices using movable or even removable storage media could also or instead be used. The queues 34, 36 store communication traffic that may be received from any of a number of types of traffic sources, including user communication devices, for example, while that traffic is waiting to be scheduled by the scheduler 38. The queues 34, 36 might include respective queues for storing communication traffic having different scheduling priorities, respective queues for storing communication traffic to be transmitted to different destinations, or both. For instance, each queue 34, 36 might be specific to traffic that has a particular scheduling priority and is to be transmitted to a particular destination.

Software, hardware, firmware, or combinations thereof may be used to implement the scheduler 38 and/or the memory manager 40. Any or all of microprocessors for executing software stored on a computer-readable medium, Application Specific Integrated Circuits (ASICs), Programmable Logic Devices (PLDs), and Field Programmable Gate Arrays (FPGAs) are examples of devices that may be suitable for implementing these components. Given such a broad range of possible implementations, these components are described below primarily in terms of their functions. Based on these functional descriptions, a person skilled in the art would be enabled to implement embodiments of the invention in any of various ways.

The user interface 41 represents one or more devices that receive inputs from a user. A local or remote user terminal through which an operator configures a communication device or equipment might include a keyboard, a mouse, and/or a touch screen, for example, any or all of which may be used to program various settings associated with the memory manager 40.

Considering the actual interconnections between the components shown in FIG. 3, these may, at least to some extent, be implementation-dependent. Physical connections such as traces on an electronic circuit card, other types of wired connections, and wireless connections, as well as logical connections between software components through common memory areas or registers, represent examples of operative couplings that may be provided in embodiments of the invention. For example, the interface 42 through which the memory manager 40 accesses the queues 34, 36 may be a bus connection in some embodiments, and is shown in FIG. 3 as a connection. The scheduler 38 and the memory manager 40 may be operatively coupled together through a similar or different type of connection. The memory manager 40 might have access to storage locations in which scheduling parameters are stored, for instance, to thereby allow the memory manager to coordinate removal of traffic from the shared memory 32 with scheduling of traffic by the scheduler 38.

In operation, the scheduler 38 schedules communication traffic from the queues 34, 36 toward one or more destinations. The traffic need not necessarily be transmitted directly to such destinations. Where the architecture 30 is implemented in a network element in a communication network, for example, transmission to a destination may involve other intervening network elements and/or other equipment. There may also be intervening components (not shown) between the scheduler 38 and a communication interface through which communication equipment outputs traffic to a communication medium. Embodiments of the present invention are in no way limited to any particular transfer arrangements, mechanisms, or protocols, as will become apparent as the present description proceeds.

Any of various scheduling algorithms may be applied by the scheduler 38. Those skilled in the art will be familiar with many such algorithms.

The memory manager 40 is used in parallel with the scheduler 38. It manages the shared memory 32 actively and dynamically to reduce the likelihood of scheduling errors as well as other undesired side-effects of shared memory space shortages. It also improves shared memory efficiency by allowing ingress data to occupy up to the full capacity of the entire memory 32.

Two rules are defined for the memory manager 40 in some embodiments. An activation rule can be set to monitor usage of the shared memory 32 and to trigger the memory manager 40 based on amounts of traffic stored in the shared memory. A traffic removal mechanism could be triggered, for example, when the occupancy level of the shared memory 32 is above a threshold. Per-queue thresholds are also contemplated. A removal rule could be used by the memory manager 40 to determine from which egress queue (or queues) 34, 36 stored traffic should be removed.

On the ingress side, traffic might be allowed to enter the shared memory 32 up to its maximum capacity so that there is no tail drop. Each queue can utilize the full storage capacity if there is no congestion on the egress side. The memory manager 40 decides which traffic should be discarded if congestion occurs at a later time. When the activation rule is triggered, the memory manager 40 checks each queue 34, 36, looking for traffic that meets the removal rule. Once such traffic is found, the memory manager 40 removes the traffic, illustratively traffic stored in a lower precedence queue, from the occupied shared memory 32 and releases the freed storage space for the new traffic from the traffic source(s).

The activation rule might include a single threshold or multiple thresholds for shared memory occupancy. The threshold(s) may be programmable in some embodiments. Threshold programming could be provided, for example, through a user interface 41 such as a keyboard, mouse, or touchscreen, at an operator terminal through which communication equipment is configured.

Any of a number of different types of removal rules could be used. Examples of removal rules include, but are not limited to, removal rules based on one or more of the following:
 a. a programmable algorithm associated with the egress scheduling algorithm, e.g. SP (Strict Priority only), SP+DWRR (Strict Priority for some of the queues and Weighted Round Robin for the rest), SP+RR (Strict Priority for some of the queues and Round Robin for the rest), RR (Round Robin only), DWRR (Deficit Weighted Round Robin) or WRR (Weighted Round Robin), possibly for each egress destination;

b. for a system with multiple egress destinations, a programmable threshold could be associated with each egress destination, to determine how the shared memory 32 should be partitioned among the destinations;

c. a time-stamp that indicates the time when the stored data entered the queues and can later be used by the memory manager 40 to determine the latency of the stored data.

Any of several queue arrangements could be applicable for a destination-based removal rule. Queues might be associated with respective different destinations, for example. There is another case where multiple queues are associated with one destination. The egress scheduler (of each destination) then selects the queue based on an egress scheduling algorithm. Where multiple queues need to be scheduled to multiple destinations, egress scheduling could be performed in two stages: the first one selects the destination to be serviced and the second stage decides the queue from which to fetch traffic to be transmitted.

For the purposes of illustration of removal of traffic from the shared memory 32, consider the same example described above with reference to FIGS. 1 and 2. After the first one-second period, 200 Mb of traffic has been received and 50 Mb of traffic has been scheduled out of Queue N (34), leaving 50 Mb of traffic in Queue N and 100 Mb of traffic in Queue 1 (36). These amounts of stored traffic are detected by the memory manager 40. Various mechanisms for queue depth or occupancy detection will be known to those skilled in the art, and could be used for this purpose. The memory manager 40 might access each queue to determine the amount of storage space in the shared memory 32 it currently occupies, or the queues could be configured to report their occupancy levels to the memory manager 40 or to another component from which the memory manager obtains the occupancy levels, for instance. Queue occupancies might be determined for other purposes in a communication device or equipment, for example, and in this case the memory manager 40 could be provided with those determined occupancy levels.

According to the conventional memory management techniques described above, the 100 Mb of traffic remains in the lower precedence Queue 1 (36) after the first one-second period, awaiting scheduling, and new incoming traffic is split between the queues 34, 36 until the shared memory 32 is full. The memory manager 40, however, can detect the amounts of traffic stored in the queues 34, 36 and remove sufficient stored traffic from Queue 1 (36) to make room in the memory 32 for the entire 100 Mb of higher priority traffic that arrives in the second one-second period shown in FIG. 2. This allows the scheduler 38 to schedule 150 Mb of higher precedence traffic during the second one-second period, which would be expected in the example scenario. The scheduling error noted above is avoided entirely, without requiring a larger memory space. Also in the second one-second period, the memory manager 40 allows 50 Mb of new traffic enter the lower precedence Queue 1 (36), replacing previously stored traffic, which may be overdue.

The actual mechanism for removal of communication traffic from a queue 34, 36 may to some extent be implementation-dependent. In one embodiment, a memory location storing traffic that is to be removed is marked as available instead of occupied, and can then be over-written with new traffic. Such a memory location could instead be over-written with default or null data by the memory manager 40 to effectively erase that location before new traffic is written. Traffic could be read out from a queue and discarded so that the storage space is released. Another option is to re-arrange queue pointers so that old traffic is over-written by new traffic.

It should thus be apparent that the "discarded traffic" output of the memory manager 40 shown in FIG. 3 is intended solely to illustrate the function of removing traffic from the shared memory 32. The memory manager 40 need not necessarily output any traffic.

Re-allocation of memory space in the shared memory 32 from one queue to another may similarly be dependent on implementation. Different communication devices and equipment may use different allocation mechanisms for the queues 34, 36. For maximum flexibility, the queues 34, 36 are elastic queues that may expand until they occupy the total capacity of the shared memory 32. In this case, the memory manager 40 may remove traffic from Queue 1 (36) so as to provide additional space for Queue N (34). In the above example, considering the second one-second period shown in FIG. 2, the memory manager 40 could remove the oldest 50 Mb of traffic from Queue 1 (36) at the beginning of that period to provide 150 Mb of available space for Queue N (34), and continue to remove the oldest traffic from Queue 1 as new traffic for that queue arrives, so as to maintain 150 Mb for storage of traffic to Queue N. This avoids any loss of higher precedence traffic, and ensures an average egress data rate of 100 Mbps, all of which is high precedence traffic from Queue N (34), as would be expected in the example scenario.

The description above relates to the case of the egress scheduler 38 being in a "Strict Priority" mode, where the memory manager 40 always monitors the storage need for the highest priority queue first and discards traffic from the lowest priority queue first. If the egress scheduler 38 is in a "WRR" mode, where the egress traffic ratio is set to "Queue N vs Queue 1=1:4" (for every one byte of traffic sent out from Queue N (34), 4 bytes of traffic from Queue 1 (36) are also to be sent out), for instance, then the memory manager 40 cannot simply remove all of the traffic in Queue 1. The egress scheduler 38 provides this traffic profile requirement to the memory manager 40. The memory manager 40 discards from Queue 1 (36), as well as Queue N (34), in a "REVERSED WRR RATIO" order so that the shared memory 32 always maintains 40 Mb of traffic in Queue N (34) and 160 Mb of data in Queue 1 (36), to satisfy the egress scheduling profile. The removal or discard ratio thus follows the scheduling ratio and only excessive data in each queue is removed.

Thus, when the egress scheduler 38 is in "SP" mode, traffic is always scheduled and transmitted from the highest priority queue first. The memory manager 40 removes traffic in "reversed SP" order, and always discards traffic from the lowest priority queue first. When the egress scheduler 38 is in a "WRR" or a "DWRR" mode, the memory manager 40 maintains the shared storage content based on the scheduling ratio. When the egress scheduler 38 is in an "SP+DWRR" or an "SP+WRR" mode, the memory manager 40 will try to satisfy the "SP" queues first by removing traffic from the "WRR" queues. During traffic removal, it follows the scheduling ratio and only discards excessive data in each queue. More generally, traffic removal can be coordinated with a scheduling algorithm.

The memory manager 40 might also discard traffic solely based on time-stamp information, or combine the time-stamp rule with egress scheduling profiles. Other removal rules may also or instead be used by the memory manager 40, such as data-type, data-length, or any other kind of classification result.

Since the memory manager 40 is implemented at the egress side of the shared memory 32 and thus the queues 34, 36, it can take into account the storage needs of the scheduler 38. The scheduler 38 might report its bandwidth profile to the memory manager 40 through the interface 44, for example.

Another option would be to provide the memory manager 40 with access to egress bandwidth profiles or parameters in a configuration memory (not shown). Removal of traffic from the shared memory 32 can thus be coordinated with scheduling. In the above example, coordination between the scheduler 38 and the memory manager 40 allows the memory manager to ensure that sufficient traffic is stored to fulfill scheduling bandwidth.

The architecture 30 thus represents one example of an apparatus that includes an interface 42, which provides access to a shared memory 32, and a memory manager 40. The shared memory 32 provides queues 34, 36 for storing communication traffic to be scheduled for transmission. The memory manager 40 is operatively coupled to the interface 42 and determines, based on amounts of communication traffic stored in the queues 34, 36, whether communication traffic is to be removed from the shared memory 32, and removes communication traffic from the shared memory where it is determined that communication traffic is to be removed.

The memory manager 40 may remove communication traffic from the shared memory 32 in accordance with a removal rule. The removal rule could be based (i) on a scheduling algorithm used by the scheduler 38 for scheduling communication traffic out of the queues 34, 36 for transmission, (ii) on respective thresholds, which may be programmable thresholds, associated with the queues 34, 36, and/or (iii) on latency of the communication traffic stored in the queues.

Memory space that is freed in the shared memory 32 by removing communication traffic from one of the queues 34, 36 can also be re-allocated to a different one of the queues. Coordination of the memory manager 40 and the scheduler 38 further improves efficiency of usage of the shared memory.

Embodiments of the invention have been described above primarily in the context of an apparatus. FIG. 4 is a flow diagram illustrating a method according to another embodiment of the invention. The method 50 includes an operation 52 of storing communication traffic that is to be scheduled for transmission, in a shared memory that provides multiple traffic queues. Based on the amounts of traffic stored in the queues, a determination is made at 54 as to whether traffic is to be removed from the shared memory, and if so, traffic is removed at 56. Memory space that is freed as a result of removing traffic from one queue can be re-allocated to another queue at 58. If the occupancy level of the shared memory as a whole or individual occupancy levels of the queues are acceptable, no traffic is to be removed, and storage of traffic to the shared memory at 52 and monitoring of the shared memory at 54 continue. Storage and monitoring also continue after traffic is removed and space is re-allocated at 56, 58.

It should thus be apparent that storage of traffic to the queues at 52 may be ongoing while the operations at 54 to 58 proceed. Scheduling of traffic stored in the queues at 52 is also ongoing, in parallel with the operations shown in FIG. 4.

The method 50 represents an illustrative embodiment of the invention. Other embodiments may include further, fewer, or different operations performed in a similar or different order. The operations shown in FIG. 4 may also be performed in various ways, at least some of which will be evident from the foregoing description of the architecture 30 in FIG. 3. Further variations may be or become apparent to those skilled in the art.

Embodiments of the invention may provide many benefits, which could include, among others, any of the following:

1. allowing ingress traffic to occupy up to the full capacity of a shared memory;
2. discarding stored traffic intelligently and selectively, to release memory space;
3. establishing a link between memory management and egress scheduling so that memory management can allocate memory space according to egress scheduling demand;
4. re-allocating memory space dynamically to satisfy egress scheduling bandwidth;
5. managing latency by removing overdue traffic stored in the egress queues;
6. increasing system reliability by reducing possible scheduling errors and other undesired side-effects, such as flooding a destination with older and/or lower precedence traffic, caused by memory space shortages;
7. allowing programmable rules to be used to satisfy various system configurations and egress scheduling requirements;
8. improving shared memory utilization efficiency;
9. enabling a smaller shared memory to achieve high bandwidth performance, thereby reducing system cost;
10. self-checking operation of memory management without intervention of a microprocessor or other external element-memory management functions can be triggered and run without affecting other operations of a communication device or equipment.

What has been described is merely illustrative of the application of principles of embodiments of the invention. Other arrangements and methods can be implemented by those skilled in the art without departing from the scope of the present invention.

For example, the invention is in no way limited to the divisions of functions shown in FIG. 3. Functions of both the scheduler 38 and the memory manager 40 could potentially be integrated into one physical device, such as one chip. Thus, the memory manager 40 might also be configured to schedule communication traffic, or the scheduler 38 could be configured to schedule some traffic and to discard other traffic from the queues 34, 36.

In addition, although described primarily in the context of methods and systems, other implementations of the invention are also contemplated, as instructions stored on a computer-readable medium for example.

We claim:

1. An apparatus comprising:
an interface that provides access to a shared memory, the shared memory providing a plurality of queues for storing communication traffic to be scheduled for output from the queues;
a memory manager, operatively coupled to the interface, that determines, based on amounts of communication traffic stored in the queues, whether further unscheduled communication traffic that is stored in one or more of the plurality of queues is to be removed from the shared memory in addition to communication traffic that is scheduled for output from the queues, and removes the further unscheduled communication traffic from the shared memory to free memory space in the shared memory where it is determined that the further unscheduled communication traffic is to be removed.

2. The apparatus of claim 1, wherein the memory manager removes the further unscheduled communication traffic from the shared memory in accordance with a removal rule, the removal rule being based on a scheduling algorithm for scheduling communication traffic for output from the queues.

3. The apparatus of claim 2, wherein communication traffic is scheduled from the queues in a queue scheduling priority order according to the scheduling algorithm, the removal rule specifying a queue removal order which is a reversed order of the queue scheduling priority order.

4. The apparatus of claim 1, wherein the memory manager removes the further unscheduled communication traffic from the shared memory in accordance with a removal rule, the removal rule being based on respective thresholds associated with the queues.

5. The apparatus of claim 4, wherein the thresholds comprise programmable thresholds.

6. The apparatus of claim 1, wherein the memory manager removes the further unscheduled communication traffic from the shared memory in accordance with a removal rule, the removal rule being based on latency of the communication traffic stored in the queues.

7. The apparatus of claim 1, wherein the plurality of queues comprises at least one of:
respective queues for storing communication traffic having different scheduling priorities; and
respective queues for storing communication traffic to be transmitted to different destinations.

8. The apparatus of claim 1, wherein the memory manager re-allocates the memory space, which is freed in the shared memory by removing the further unscheduled communication traffic from one of the queues, from the one of the queues to a different one of the queues.

9. The apparatus of claim 1, further comprising:
a scheduler that schedules communication traffic stored in the queues for output from the queues.

10. The apparatus of claim 9, wherein the memory manager is operatively coupled to the scheduler, and wherein the memory manager coordinates removal of the further unscheduled communication traffic from the shared memory with scheduling of communication traffic by the scheduler.

11. The apparatus of claim 9, further comprising:
the shared memory operatively coupled to the memory manager through the interface and to the scheduler.

12. The apparatus of claim 10, wherein the scheduler schedules communication traffic according to a bandwidth profile, and wherein the memory manager coordinates the removal of the further unscheduled communication traffic with the scheduling of the communication traffic by removing unscheduled communication traffic in excess of the bandwidth profile.

13. The apparatus of claim 1, wherein the memory manager schedules communication traffic stored in the queues for output from the queues.

14. A method comprising:
storing, in a shared memory that provides a plurality of queues, communication traffic to be scheduled for output from the queues;
determining, based on amounts of communication traffic stored in the queues, whether further unscheduled communication traffic that is stored in one or more of the plurality of queues is to be removed from the shared memory in addition to communication traffic that is scheduled for output from the queues; and
removing the further communication traffic from the shared memory to free memory space in the shared memory where it is determined that the further unscheduled communication traffic is to be removed.

15. The method of claim 14, wherein removing comprises removing the further unscheduled communication traffic from the shared memory in accordance with a removal rule, the removal rule being based on a scheduling algorithm for scheduling communication traffic for output from the queues.

16. The method of claim 14, wherein removing comprises removing the further unscheduled communication traffic from the shared memory in accordance with a removal rule, the removal rule being based on respective thresholds associated with the queues.

17. The method of claim 14, wherein removing comprises removing the further unscheduled communication traffic from the shared memory in accordance with a removal rule, the removal rule being based on latency of the communication traffic stored in the queues.

18. The method of claim 14, further comprising:
scheduling communication traffic stored in the queues for output from the queues.

19. The method of claim 18, further comprising:
coordinating the removing with the scheduling.

20. The method of claim 14, further comprising:
re-allocating the memory space, which is freed in the shared memory by removing the further unscheduled communication traffic from one of the queues, from the one of the queues to a different one of the queues.

21. A non-transitory computer-readable medium storing instructions, which when executed perform the method of claim 14.

22. An apparatus comprising:
a shared memory providing a plurality of queues for storing communication traffic;
a scheduler, operatively coupled to the shared memory, that schedules communication traffic stored in the queues for output from the queues; and
a memory manager, operatively coupled to the memory interface, that determines whether further unscheduled communication traffic that is stored in one or more of the plurality of queues is to be removed from the shared memory in addition to communication traffic scheduled by the scheduler, and removes the further unscheduled communication traffic from the shared memory to free memory space in the shared memory where it is determined that the further unscheduled communication traffic is to be removed, the memory manager coordinating removal of the further unscheduled communication traffic from the shared memory with scheduling of communication traffic by the scheduler.

* * * * *